United States Patent
Lee et al.

(10) Patent No.: US 8,390,647 B2
(45) Date of Patent: Mar. 5, 2013

(54) IMAGE PROCESSING SYSTEM AND METHOD

(75) Inventors: Chung-I Lee, Taipei Hsien (TW); Chien-Fa Yeh, Taipei Hsien (TW); Wei-Qing Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 789 days.

(21) Appl. No.: 12/564,722

(22) Filed: Sep. 22, 2009

(65) Prior Publication Data

US 2010/0245933 A1 Sep. 30, 2010

(30) Foreign Application Priority Data

Mar. 31, 2009 (CN) .......................... 2009 1 0301245

(51) Int. Cl.
*G09G 5/00* (2006.01)

(52) U.S. Cl. ........ 345/634; 345/589; 345/596; 345/600; 345/629; 345/636

(58) Field of Classification Search .................. None
See application file for complete search history.

(56) References Cited

U.S. PATENT DOCUMENTS

| | | | | |
|---|---|---|---|---|
| 7,187,785 | B2* | 3/2007 | Ikeda et al. ................. | 382/115 |
| 7,751,648 | B2* | 7/2010 | Tanaka ........................ | 382/284 |
| 8,295,630 | B2* | 10/2012 | Lee et al. ..................... | 382/258 |
| 2008/0284791 | A1* | 11/2008 | Bressan et al. ............. | 345/589 |

* cited by examiner

*Primary Examiner* — Antonio A Caschera
(74) *Attorney, Agent, or Firm* — Altis Law Group, Inc.

(57) ABSTRACT

An image processing system and method for comparing and correcting two monochromic images A2 and B2 that extracts a skeleton of objects in the monochromic image A2 to generate a skeleton image A3 and extracts a skeleton of objects in the monochromic image B2 to generate a skeleton image B3. The system and method then covers the skeleton image A3 with the monochromic image B2 to generate a covered image A4, and covers the skeleton image B3 with the monochromic image A2 to generate a covered image B4. The system and method further corrects allowable variances in the covered images A4 and B4, and outputs the covered images whose variances have been corrected.

19 Claims, 7 Drawing Sheets

IMAGE PROCESSING SYSTEM AND METHOD

BACKGROUND

1. Technical Field

Embodiments of the present disclosure generally relate to image processing, and more particularly to a system and method for comparing and correcting images.

2. Description of Related Art

Conventional methods of image comparison often only compare pixel values of each point of the images. Such methods of determining whether two images match may be ineffective, for example, when an image is captured using a scanner providing poor image quality, the scanned image may be not exactly match the original due to noise points registering as content differing from the original.

BRIEF DESCRIPTION OF THE DRAWINGS

FIG. 4 including FIG. 4(A) and FIG. 4(B) respectively shows a monochromic image and a skeleton image extracted from the monochromic image.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
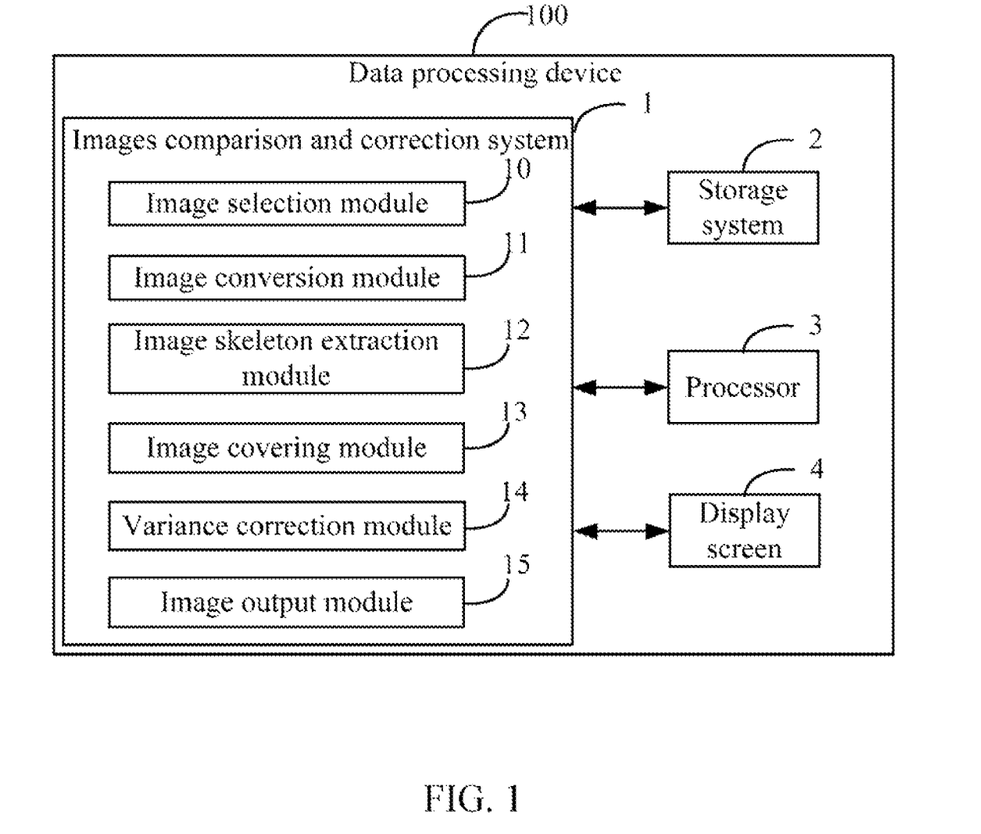
FIG. 1 is a block diagram of one embodiment of an image processing system.

FIG. 1 is a block diagram of one embodiment of an image processing system. In one embodiment, the image processing system may be a data processing device 100 that includes an image comparison and correction system 1, a storage system 2, at least one processor 3, and a display screen 4. The data processing device 100 may be a personal computer, an application server, or a notebook, for example. The image comparison and correction system 1 includes a plurality of functional modules (see below descriptions) operable to compare images and correct allowable variances therein.

In one embodiment, one or more computerized codes of the functional modules of the image comparison and correction system 1 may be stored in the storage system 2. The functional modules may include an image selection module 10, an image conversion module 11, an image skeleton extraction module 12, an image covering module 13, a variance correction module 14, and an image output module 15. The at least one processor 3 is operable to execute one or more computerized codes of the modules 10-15 to compare images from the storage system 2 and correct allowable variances therein. The display screen 4 provides a user interface displaying images to be compared.

Figure 4A:
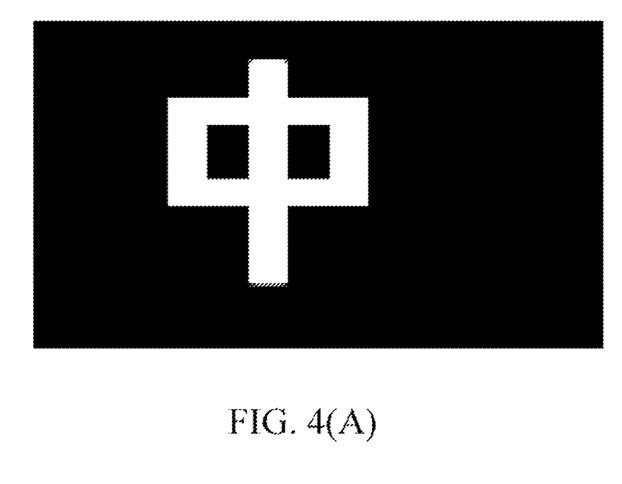

The image selection module 10 is operable to select images to be compared from the storage system 2. In one embodiment, the images to be compared may include an original image and a derived image which is generated from the original image. As an example, if the original image is scanned to generate a scanned image, the scanned image is the derived image. As mentioned, the scanned image may be different from the original image due to noise points generated by the scanner, which results in reduced image quality. However, the noise points are allowable variances between the original image and the scanned image. Thus, the original image and the scanned image need to be compared so as to delete the allowable variance. The images to be compared can be monochromic images or color images. It should be understood that, the monochromic images only include two colors, such as black and white. In the monochromic image, objects may be white and background may be black, or the objects may be black and the background may be white. FIG. 4(A) shows an example of a monochromic image, in which the object, namely a Chinese character "中", is white, and the background is black. It is easier to distinguish objects and the background in a monochromic image than a color image, thus, if the images to be compared are color images, the color images need to be converted to monochromic images.

The image conversion module 11 is operable to convert the color images to be compared to monochromic images. The monochromic images may be stored into the storage system 2. In one embodiment, the image conversion module 11 converts a color image to a monochromic image as follows. The image conversion module 11 converts the color image to a grayscale image by computing a gray value of each point of the color image using a conversion formula, such as: gray value=R*0.3+G*0.59+B*0.11. In the conversion formula, R, G, and B represent red, green, and blue values of a point of the color image. The converting module 11 converts the grayscale image to the monochromic image by comparing a gray value of each point of the grayscale image with a threshold value. In one embodiment, if a gray value of a point exceeds or equals the threshold value, the gray value is changed to 255, and if less than the threshold value, to 0. It is noted that a gray value of 255 represents white and 0 represents black. In one embodiment, the threshold value may be 127.

Figure 4B:
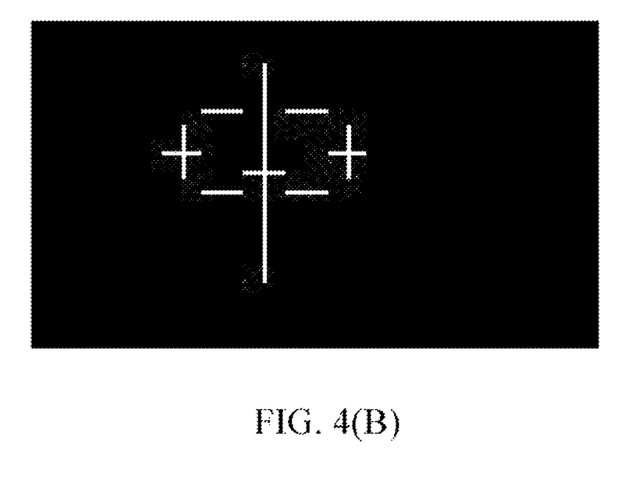

The image skeleton extraction module 12 is operable to extract skeletons of the objects in the monochromic images so as to generate skeleton images. The skeleton images may be stored into the storage system 2. One example of a skeleton image is showed in FIG. 4(B). The skeleton image showed in FIG. 4(B) is extracted from the monochromic image of FIG. 4(A). It should be understood that a skeleton image corresponds to a monochromic image. In one embodiment, the image skeleton extraction module 12 reads pixel values of all points in each row of the monochromic image. In the present embodiment, each of the pixel values is 0 or 255, since the monochromic image only includes the colors of black and white. As an example, if the objects in the monochromic image are white, and the background is black, the pixel values of the background are 0 and the pixel values of the objects are 255. The image skeleton extraction module 12 then searches the pixel values of the objects in each row to locate a plurality of groups that include consecutive pixel values of the objects. As an example, if the pixel values of all points in a row of the monochromic image include: 255, 255, 255, 0, 0, 255, 255, 255, 255, 255, 0, 0, and 255, the image skeleton extraction module 12 locates two groups including "255, 255, 255" and "255, 255, 255, 255, 255." The image skeleton extraction module 12 finally updates the pixel values in each group by maintaining a central pixel value and changing the other pixel values. In the example, the pixel values in each group other than the central pixel value are changed from 255 to 0. Thus, the pixel values in the two groups are updated to "0, 255, 0" and "0, 0, 255, 0, 0." Accordingly, in the example, the pixel values of all points in the row are changed to "0, 255, 0, 0, 0, 0, 0, 255, 0, 0, 0, 0, and 255."

The image covering module 13 includes a plurality of functional sub-modules (see below descriptions referring to FIG. 2), operable to cover the skeleton images with the monochromic images so as to generate covered images. The covered images may be stored into the storage system 2. In one embodiment, if a skeleton image B3 corresponds to a monochromic image B2, and a skeleton image A3 corresponds to a monochromic image A2, the image covering module 13 covers the skeleton image B3 with the monochromic image A2 to generate a covered image B4, and covers the skeleton image A3 with the monochromic image B2 to generate a covered image A4.

The variance correction module 14 includes a plurality of functional sub-modules (see below descriptions referring to FIG. 3), operable to correct allowable variances in the covered images by comparing the covered images with the monochromic images. If the covered image B4 is generated by covering the skeleton image B3 with the monochromic image A2, the variance correction module 14 corrects allowable variances in the covered image B4 by comparing the covered image B4 with the monochromic image A2. If the covered image A4 is generated via covering the skeleton image A3 with the monochromic image B2, the variance correction module 14 corrects allowable variances in the covered image A4 by comparing the covered image A4 with the monochromic image B2.

The image output module 15 is operable to output the covered images with corrected variances on the display screen 4 of the data processing device 100.

Figure 2:
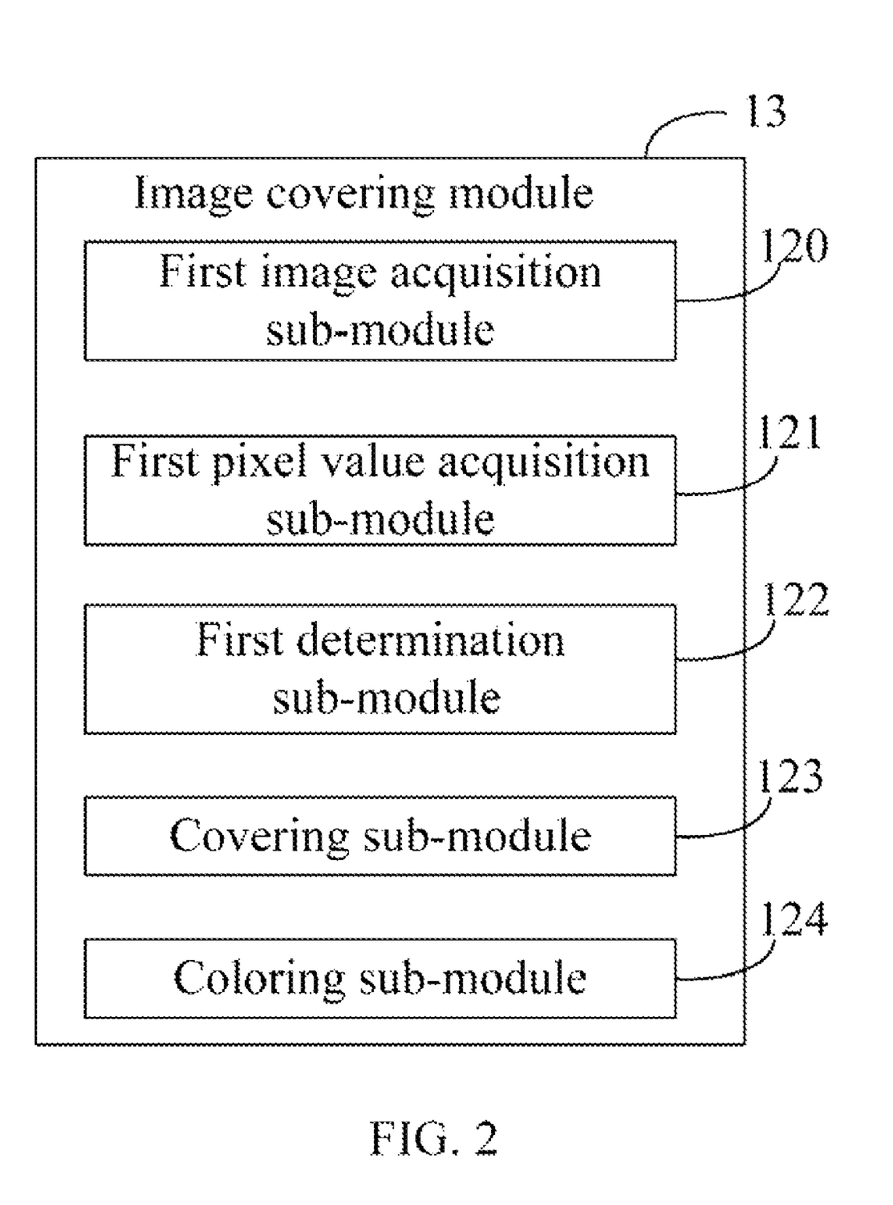
FIG. 2 is a block diagram of functional sub-modules of an image covering module of the system of FIG. 1.

FIG. 2 is a block diagram of the functional sub-modules 120-124 of the image covering module 13. In one embodiment, the functional sub-modules 120-124 may be a first image acquisition sub-module 120, a first pixel value acquisition sub-module 121, a first determination sub-module 122, a covering sub-module 123, and a coloring sub-module 124.

The first image acquisition sub-module 120 is operable to acquire a monochromic image and a skeleton image from the storage system 2. In the following, both the monochromic image and the skeleton image acquired by the first image acquisition sub-module 120 have black objects on a white background.

The first pixel value acquisition sub-module 121 is operable to acquire pixel values of all points in an Nth row of the monochromic image and of all points in an Nth row of the skeleton image. Each of the pixel values is 0 or 255. It should be understood that the Nth row is selected from the first row to the last row of the monochromic image and the skeleton image.

The first determination sub-module 122 is operable to determine whether the pixel value of an nth point in the Nth row of the monochromic image is the same as the pixel value of an nth point in the Nth row of the skeleton image. It should be understood that the nth point is selected from the first point to the last point in the Nth row of the monochromic image and the skeleton image. The first determination sub-module 122 is further operable to determine whether the pixel value of the nth point in the Nth row of the monochromic image is 0 if the pixel value of the nth point in the Nth row of the monochromic image is different from the pixel value of the nth point in the Nth row of the skeleton image. The first determination module 122 is further operable to determine if the nth point is the last point in the Nth row, and if the Nth row is the last row of the monochromic image.

The covering sub-module 123 is operable to cover the nth point in the Nth row of the skeleton image with the nth point in the Nth row of the monochromic image if the pixel value of the nth point in the Nth row of the monochromic image is the same as the pixel value of the nth point in the Nth row of the skeleton image, or the pixel value of the nth point in the Nth row of the monochromic image is 0.

The coloring sub-module 124 is operable to color the nth point in the Nth row of the skeleton image if the pixel value of the nth point in the Nth row of the monochromic image is different from the pixel value of the nth point in the Nth row of the skeleton image and the pixel value of the nth point in the Nth row of the monochromic image is not 0, but 255.

Figure 3:
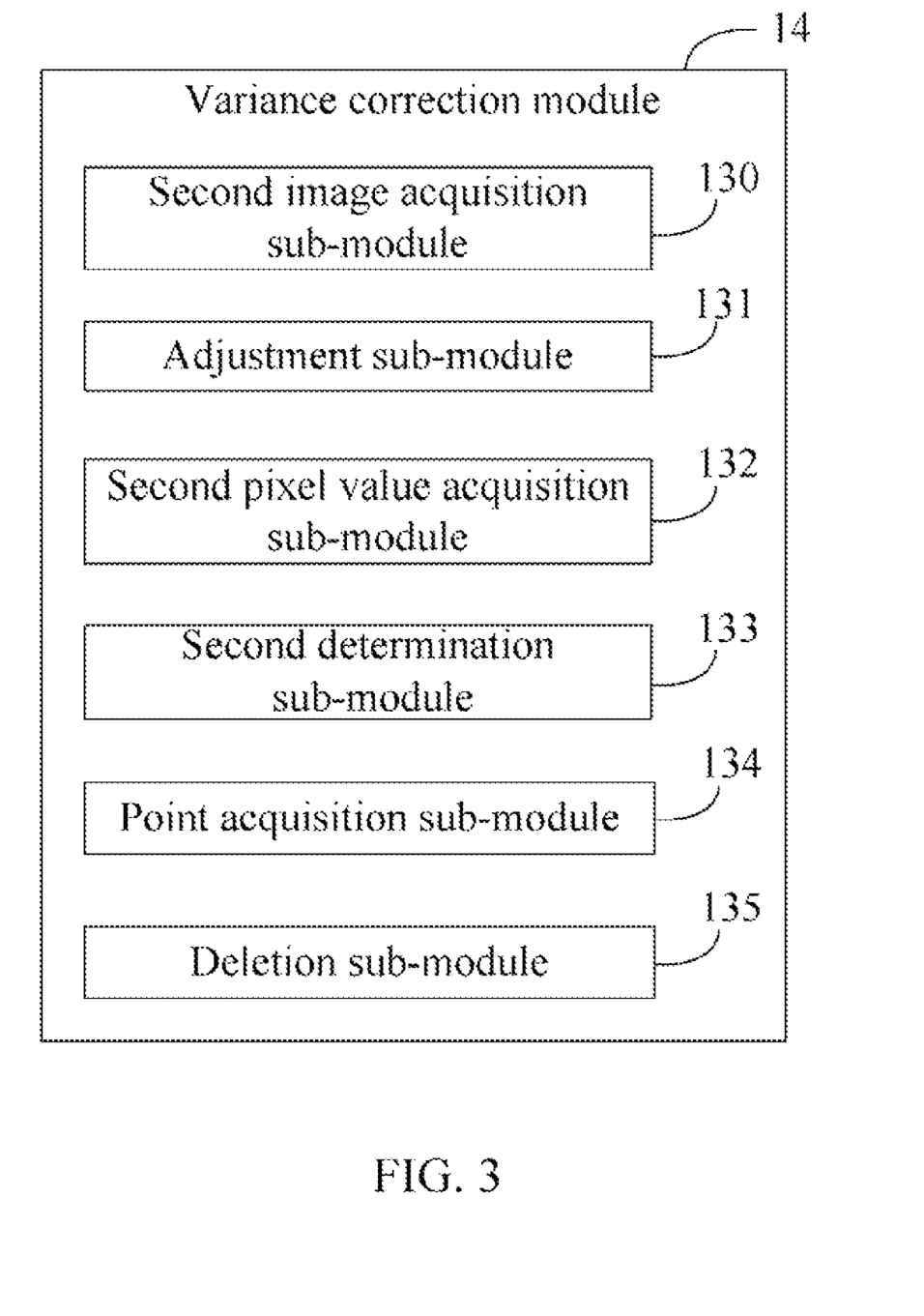
FIG. 3 is a block diagram of functional sub-modules of a variance correction module of the system of FIG. 1.

FIG. 3 is a block diagram of the functional sub-modules 130-135 of the variance correction module 14. In one embodiment, the functional sub-modules 130-135 may comprise a second image acquisition sub-module 130, an adjustment sub-module 131, a second pixel value acquisition sub-module 132, a second determination sub-module 133, a point acquisition sub-module 134, and a deletion sub-module 135.

The second image acquisition sub-module 130 is operable to acquire a monochromic image and a covered image from the storage system 2.

The adjustment sub-module 131 is operable to adjust the covered image according to the monochromic image for the two images having the same dimensions. In one embodiment, the dimension includes a height and a width.

The second pixel value acquisition sub-module 132 is operable to acquire pixel values of all points in an Nth row of the monochromic image and pixel values of all points in an Nth row of the covered image. It should be understood that the Nth row is selected from the first row to the last row of the monochromic image and the covered image.

The second determination sub-module 133 is operable to determine whether the pixel value of an nth point in the Nth row of the monochromic image is the same as the pixel value of an nth point in the Nth row of the covered image. It should be understood that the nth point is selected from the first point to the last point in the Nth row of the monochromic image and the covered image. The second determination sub-module 134 is further operable to determine if the nth point is the last point in the Nth row and if the Nth row is the last row of the monochromic image.

The point acquisition sub-module 134 is operable to acquire a plurality of points from the monochromic image if the pixel value of the nth point in the Nth row of the monochromic image is different from the pixel value of the nth point in the Nth row of the covered image. The plurality of acquired points can be used to determine whether the nth point in the Nth row of the covered image should be deleted or retained. In one embodiment, the plurality of acquired points is adjacent to the nth point in the Nth row of the monochromic image.

The deletion sub-module 135 is operable to delete the nth point from the Nth row of the covered image if at least one of the plurality of acquired points has the same pixel value as the objects in the monochromic image. For example, if the objects in the monochromic image are black, and at least one of the plurality of acquired points has a pixel value of 0, the deletion sub-module 135 deletes the nth point from the Nth row of the covered image.

Figure 5:
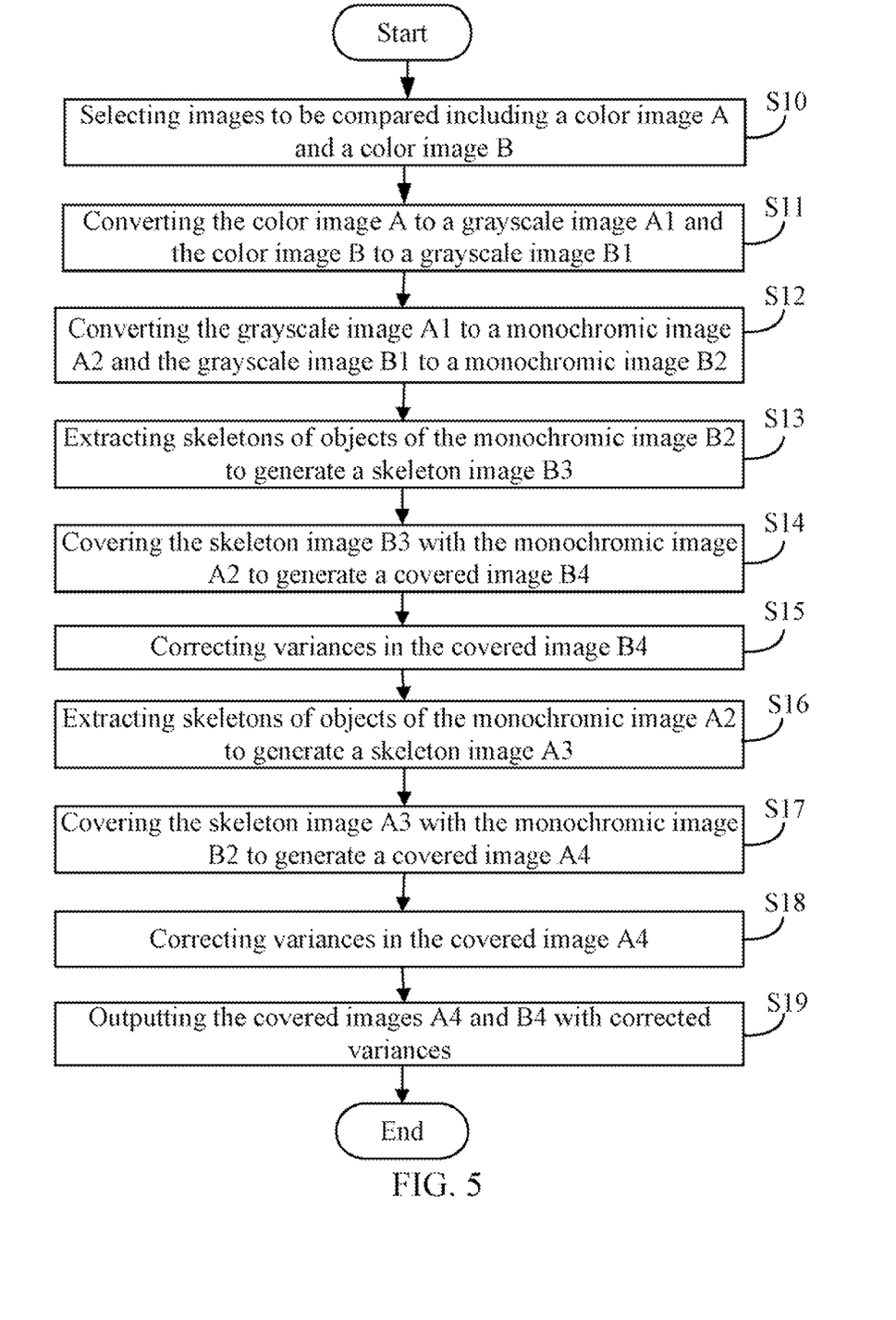
FIG. 5 is a flowchart of one embodiment of an image processing method.

FIG. 5 is a flowchart illustrating one embodiment of an image processing method. Depending on the embodiment, additional blocks in the flow of FIG. 5 may be added, others removed, and the ordering of the blocks may be changed.

In block S10, the image selection module 10 selects images to be compared from the storage system 2. The images to be compared may be monochromic images or color images. In the present embodiment, the images to be compared are color images including a color image A and a color image B.

In block S11, the image conversion module 11 converts the color image A to a grayscale image A1 and converts the color image B to a grayscale image B1. In an embodiment, the conversion is accomplished by computing a gray value of each point of the color images A and B using a conversion formula, such as: gray value=R*0.3+G*0.59+B*0.11. In the conversion formula, R, G, and B represent red, green, and blue values.

In block S12, the image conversion module 11 converts the grayscale image A1 to a monochromic image A2 and converts the grayscale image B1 to a monochromic image B2. The monochromic images A2 and B2 may be stored into the storage system 2. In an embodiment, the conversion is accomplished by comparing a gray value of each point of the grayscale images A1 and B1 with a threshold value. In one embodiment, the threshold value may be 127. If a gray value of a point exceeds or equals the threshold value, the gray value is changed to 255, and if a gray value of a point is less than the threshold value, the gray value is changed to 0. It should be understood that the gray value of 255 represents white and the gray value of 0 represents black. Thus, in the present embodiment, the monochromic images A2 and B2 only include two colors of black and white.

In block S13, the image skeleton extraction module 12 extracts skeletons of objects in the monochromic image B2 so as to generate a skeleton image B3. The skeleton image B3 may be stored into the storage system 2. In one embodiment, the image skeleton extraction module 12 reads pixel values of all points in each row of the monochromic image B2. The image skeleton extraction module 12 then searches the pixel values of the objects in each row to locate a plurality of groups that include consecutive pixel values of the objects. As an example, if the objects in the monochromic image B2 are white, and if the pixel values of all points in a row of the monochromic image include: 255, 255, 255, 0, 0, 255, 255, 255, 255, 255, 0, 0, and 255, the image skeleton extraction module 12 locates two groups including "255, 255, 255" and "255, 255, 255, 255, 255." The image skeleton extraction module 12 finally updates the pixel values in each group by maintaining a central pixel value and changing the other pixel values. In the example, the pixel values in each group other than the central pixel value are changed from 255 to 0. Thus, the pixel values in the two groups are updated to "0, 255, 0" and "0, 0, 255, 0, 0." Accordingly, in the example, the pixel values of all points in the row are changed to "0, 255, 0, 0, 0, 0, 0, 255, 0, 0, 0, 0, and 255."

In block S14, the image covering module 13 covers the skeleton image B3 with the monochromic image A2 so as to generate a covered image B4. The covered image B4 may be stored into the storage system 2. A detailed description of generating the covered image B4 is given as follows, referring to FIG. 6.

In block S15, the variance correction module 14 corrects allowable variances in the covered image B4, as follows, referring to FIG. 7.

In block S16, the image skeleton extraction module 12 extracts skeletons of objects in the monochromic image A2 so as to generate a skeleton image A3. The skeleton image A3 may be stored into the storage system 2. As mentioned, the image skeleton extraction module 12 reads pixel values of all points in each row of the monochromic image A2. The image skeleton extraction module 12 then searches the pixel values of the objects in each row to locate a plurality of groups that include consecutive pixel values of the objects. The image skeleton extraction module 12 finally updates the pixel values in each group by maintaining a central pixel value and changing the other pixel values.

In block S17, the image covering module 13 covers the skeleton image A3 with the monochromic image B2 so as to generate a covered image A4, as follows, referring to FIG. 6. The covered image A4 may be stored into the storage system 2.

In block S18, the variance correction module 14 corrects allowable variances in the covered image A4, as follows, referring to FIG. 7.

In block S19, the image output module 15 outputs the covered images A4 and B4 with corrected variances on the display screen 4 of the data processing device 100.

Figure 6:
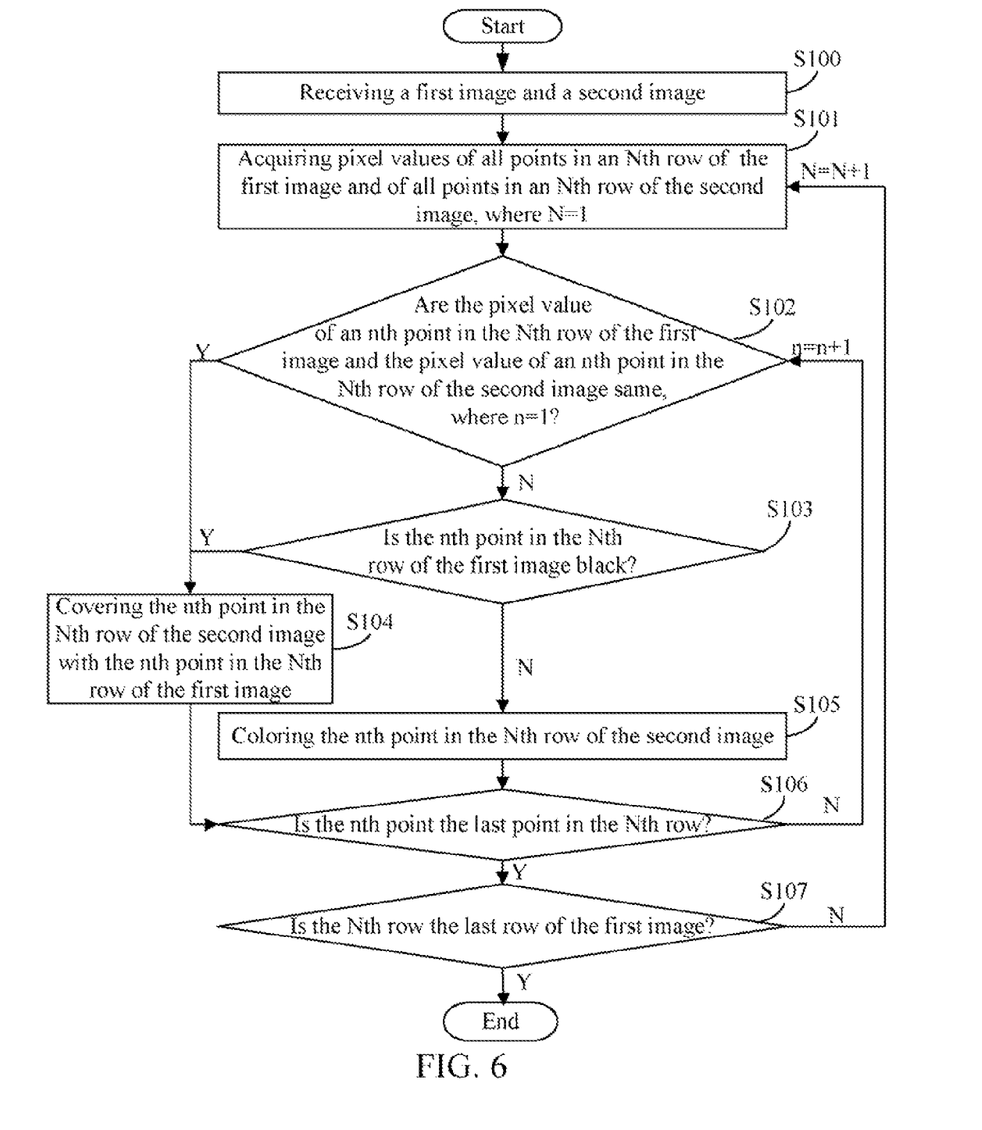
FIG. 6 details blocks S14 and S17 of FIG. 5.

FIG. 6 details blocks S14 and S17 of FIG. 5, namely, generation of covered image B4 or A4. Depending on the embodiment, additional blocks in the flow of FIG. 6 may be added, others removed, and the ordering of the blocks may be changed.

In block S100, the first image acquisition sub-module 120 acquires a first image and a second image from the storage system 2. In one embodiment, both the first image and the second image have black objects on a white background. In the description of generating the covered image B4, the first image is the monochromic image A2 and the second image is the skeleton image B3. In the description of generating the covered image A4, the first image is the monochromic image B2 and the second image is the skeleton image A3.

In block S101, the first pixel value acquisition sub-module 121 acquires pixel values of all points in an Nth row of the first image and acquires pixel values of all points in an Nth row of the second image. In one embodiment, N=1. It should be understood that each of the pixel values is 0 or 255.

In block S102, the first determination sub-module 122 determines whether the pixel value of an nth point in the Nth row of the first image is the same as the pixel value of an nth point in the Nth row of the second image. In one embodiment, n=1. Block S104 is implemented if the pixel value of the nth point in the Nth row of the first image is the same as the pixel value of the nth point in the Nth row of the second image. If the pixel value of the nth point in the Nth row of the first image is different from the pixel value of the nth point in the Nth row of the second image, block S103 is implemented.

In block S103, the first determination sub-module 122 further determines whether the pixel value of the nth point in the Nth row of the first image is 0, namely, whether the nth point in the Nth row of the first image is black. If so, block S104 is implemented. If not, block S105 is implemented.

In block S104, the covering sub-module 123 covers the nth point in the Nth row of the second image with the nth point in the Nth row of the first image. After block S104, block S106 is implemented.

In block S105, the coloring sub-module 124 colors the nth point in the Nth row of the second image.

In block S106, the first determination sub-module 122 further determines if the nth point is the last point in the Nth row of the first image. If the nth point is not the last point in the Nth row of the first image, block S102 is implemented to determine whether the pixel value of an (n+1)th point in the Nth row of the first image is the same as the pixel value of an (n+1)th point in the Nth row of the second image. If the nth point is the last point in the Nth row of the first image, block S107 is implemented.

In block S107, the first determination sub-module 122 further determines if the Nth row is the last row of the first image. If not, block S101 is repeated to acquire pixel values of all points in an (N+1)th row of the first image and of all points in an (N+1)th row of the second image.

Figure 7:
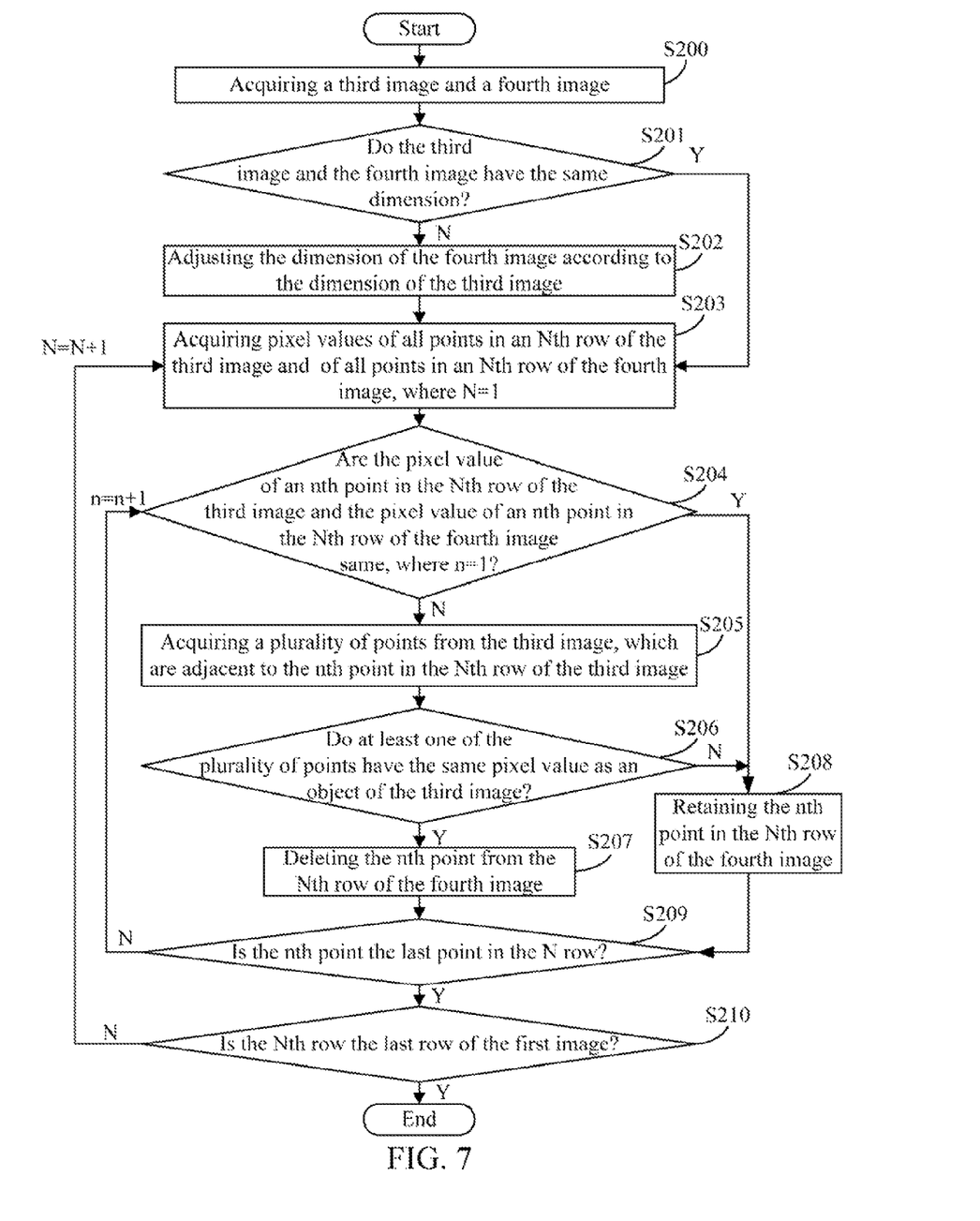
FIG. 7 details blocks S15 and S18 of FIG. 5.

FIG. 7 details blocks S15 and S18 of FIG. 5, namely, correction of allowable variances in the covered image B4 or A4. Depending on the embodiment, additional blocks in the flow of FIG. 7 may be added, others removed, and the ordering of the blocks may be changed.

In block S200, the second image acquisition sub-module 130 acquires a third image and a fourth image from the storage system 2. In the description of correcting allowable variances in the covered image B4, the third image is the monochromic image A2 and the second image is the covered image B4. In the description of correcting allowable variances in the covered image A4, the third image is the monochromic image B2 and the fourth image is the covered image A4.

In block S201, the adjustment sub-module 131 determines if the third image and the fourth image have the same dimensions. In one embodiment, the dimension includes a height and a width. If so, block S203 is implemented. If not, block S202 is implemented.

In block S202, the adjustment sub-module 131 adjusts the height and/or the width of the fourth image according to the height and the width of the third image.

In block S203, the second pixel value acquisition sub-module 132 acquires pixel values of all points in an Nth row of the third image and pixel value of all points in an Nth row of the fourth image. In one embodiment, N=1.

In block S204, the second determination sub-module 133 determines whether the pixel value of an nth point in the Nth row of the third image is the same as the pixel value of an nth point in the Nth row of the fourth image. In one embodiment, n=1. If so, block S208 is implemented. If not, block S205 is implemented.

In block S205, the point acquisition sub-module 134 acquires a plurality of points from the third image to determine whether the nth point in the Nth row of the fourth image should to be deleted or retained. In one embodiment, the plurality of acquired points is adjacent to the nth point in the Nth row of the third image.

In block S206, the second determination sub-module 133 further determines whether at least one of the plurality of acquired points has the same pixel value as the objects of the third image. For example, if the objects of the third image are white, the second determination sub-module 133 determines whether pixel value of at least one of the plurality of the acquired points is 255. If none of the plurality of acquired points has the same pixel value as the objects of the third image, block S208 is implemented. If at least one of the plurality of acquired points has the same pixel value as the objects of the third image, block S207 is implemented.

In block S207, the deletion sub-module 135 deletes the nth point from the Nth row of the fourth image.

In block S208, the nth point in the Nth row of the fourth image is retained.

In block S209, the second determination sub-module 134 determines if the nth point is the last point in the Nth row of the third image. If not, block S204 is implemented to determine whether the pixel value of an (n+1)th point in the Nth row of the third image is the same as the pixel value of an (n+1)th point in the Nth row of the fourth image. If so, block S210 is implemented.

In block S210, the second determination sub-module 134 determines if the Nth row is the last row of the third image. If not, block S203 is implemented to acquire pixel values of all points in an (N+1)th row of the third image and pixel value of all points in an (N+1)th row of the fourth image.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image processing method for comparing and correcting images, the method being performed by execution of computer readable program code by at least one processor, the method comprising:
   (a) selecting images comprising a monochromic image A2 and a monochromic image B2 from a storage system by the at least one processor;
   (b) extracting skeletons of objects in the monochromic image B2 to generate a skeleton image B3 by the at least one processor;
   (c) covering the skeleton image B3 with the monochromic image A2 to generate a covered image B4 by the at least one processor;
   (d) correcting allowable variances in the covered image B4 by the at least one processor;
   (e) extracting skeletons of the objects of the monochromic image A2 to generate a skeleton image A3 by the at least one processor;
   (f) covering the skeleton image A3 with the monochromic image B2 to generate a covered image A4 by the at least one processor;
   (g) correcting allowable variances in the covered image A4 by the at least one processor; and
   (h) outputting the covered images A4 and B4 with corrected variances by the at least one processor.

2. The method as described in claim 1, wherein if the selected images are color images comprising a color image A and a color image B, the method further comprises before step (a):
   converting the color image A to a grayscale image A1 and the color image B to a grayscale image B1 by computing a gray value of each pixel of the color images A and B using a conversion formula by the at least one processor; and
   converting the grayscale image A1 to the monochromic image A2 and the grayscale image B1 to the monochromic image B2 by comparing a gray value of each point of the grayscale images A1 and B1 with a predefined threshold value by the at least one processor.

3. The method as described in claim 1, wherein step (b) comprises:
   reading pixel values of all points in each row of the monochromic image B2 by the at least one processor;
   searching the pixel values of the objects of the monochromic image B2 in each row to locate groups that include consecutive pixel values of the objects by the at least one processor; and updating the pixel values in each group by maintaining a central pixel value and changing the other pixel values so as to generate the skeleton image B3 by the at least one processor.

4. The method as described in claim 1, wherein step (c) comprises:
   (c1) acquiring pixel values of all points in the first row of the monochromic image A2 and pixel values of all points in the first row of the skeleton image B3 by the at least one processor;
   (c2) covering the first point in the first row of the skeleton image B3 with the first point in the first row of the monochromic image A2 upon the condition that the pixel value of the first point in the first row of the monochromic image A2 is the same as the pixel value of the first point in the first row of the skeleton image B3, or the pixel value of the first point in the first row of the monochromic image A2 is 0 by the at least one processor; or
   (c3) coloring the first point in the first row of the skeleton image B3 upon the condition that the pixel value of the first point in the first row of the monochromic image A2 is different from the pixel value of the first point in the first row of the skeleton image B3, and the pixel value of the first point in the first row of the monochromic image A2 is not 0 by the at least one processor;
   (c4) repeating steps (c2) and (c3) until all points in the first row of the skeleton image B3 are covered or colored by the at least one processor; and
   (c5) repeating steps (c1) to (c4) until all points in all rows of the skeleton image B3 are covered or colored so as to generate the covered image B4 by the at least one processor.

5. The method as described in claim 1, wherein step (d) comprises:
   (d1) acquiring pixel values of all points in the first row of the monochromic image A2 and pixel value of all points in the first row of the covered image B4 by the at least one processor;
   (d2) deleting the first point from the first row of the covered image B4 upon the condition that the pixel value of the first point in the first row of the monochromic image A2 is the same as the pixel value of the first point in the first row of the covered image B4 by the at least one processor;
   (d3) acquiring a plurality of points from the monochromic image A2 to determine whether the first point in the first row of the covered image B4 is deleted or retained upon the condition that the pixel value of the first point in the first row of the monochromic image A2 is different from the pixel value of the first point in the first row of the covered image B4, wherein the plurality of acquired points is adjacent to the first point in the first row of the monochromic image A2 by the at least one processor;
   (d4) deleting the first point from the first row of the covered image B4 upon the condition that at least one of the plurality of acquired points has the same pixel value as the objects of the monochromic image A2 by the at least one processor; or
   (d5) retaining the first point in the first row of the covered image B4 upon the condition that none of the plurality of acquired points has the same pixel value as the objects of the monochromic image A2 by the at least one processor;
   (d6) repeating step (d2) to (d5) until it has been determined whether all points in the first row of the covered image B4 are to be deleted or retained by the at least one processor; and
   (d7) repeating step (d1) to (d6) until it has been determined whether all points in all rows of the covered image B4 are to be deleted or retained by the at least one processor.

6. The method as described in claim 5, wherein step (d) further comprises adjusting a height and a width of the covered image B4 according to a height and a width of the monochromic image A2 by the at least one processor.

7. The method as described in claim 1, wherein step (e) comprises:
   reading pixel values of all points in each row of the monochromic image A2 by the at least one processor;
   searching the pixel values of the objects of the monochromic image A2 in each row to locate groups that include consecutive pixel values of the objects by the at least one processor; and
   updating the pixel values in each group by maintaining a central pixel value and changing the other pixel values so as to generate the skeleton image A3 by the at least one processor.

8. The method as described in claim 1, wherein step (f) comprises:
   (f1) acquiring pixel values of all points in the first row of the monochromic image B2 and pixel values of all points in the first row of the skeleton image A3 by the at least one processor;
   (f2) covering the first point in the first row of the skeleton image A3 with the first point in the first row of the monochromic image B2 upon the condition that the pixel value of the first point in the first row of the monochromic image B2 is the same as the pixel value of the first point in the first row of the skeleton image A3, or the pixel value of the first point in the first row of the monochromic image B2 is 0 by the at least one processor; or
   (f3) coloring the first point in the first row of the skeleton image A3 upon the condition that the pixel value of the first point in the first row of the monochromic image B2 is different from the pixel value of the first point in the first row of the skeleton image A3, and the pixel value of the first point in the first row of the monochromic image B2 is not 0 by the at least one processor;
   (f4) repeating steps (f2) and (f3) until all points in the first row of the skeleton image A3 are covered or colored by the at least one processor; and
   (f5) repeating steps (f1) to (f4) until all points in all rows of the skeleton image A3 are covered or colored so as to generate the covered image A4 by the at least one processor.

9. The method as described in claim 1, wherein step (g) comprises:
   (g1) acquiring pixel values of all points in the first row of the monochromic image B2 and pixel value of all points in the first row of the covered image A4 by the at least one processor;
   (g2) deleting the first point from the first row of the covered image A4 upon the condition that the pixel value of the first point in the first row of the monochromic image B2 is the same as the pixel value of the first point in the first row of the covered image A4 by the at least one processor;
   (g3) acquiring a plurality of points from the monochromic image B2 to determine whether the first point in the first row of the covered image A4 is to be deleted or retained upon the condition that the pixel value of the first point in the first row of the monochromic image B2 is different from the pixel value of the first point in the first row of the covered image A4, wherein the plurality of acquired points is adjacent to the first point in the first row of the monochromic image B2 by the at least one processor;

(g4) deleting the first point from the first row of the covered image A4 upon the condition that at least one of the plurality of acquired points has the same pixel value as the objects of the monochromic image B2 by the at least one processor; or (g5) retaining the first point in the first row of the covered image A4 upon the condition that none of the plurality of acquired points has the same pixel value as the objects of the monochromic image B2 by the at least one processor;

(g6) repeating step (g2) to (g5) until it ha been determined whether all points in the first row of the covered image A4 are to be deleted or retained by the at least one processor; and (g7) repeating step (g1) to (g6) until it has been determined whether all points in all rows of the covered image A4 are to be deleted or retained by the at least one processor.

10. The method as described in claim 9, wherein step (g) further comprises adjusting a height and a width of the covered image A4 according to a height and a width of the monochromic image B2 by the at least one processor.

11. A non-transitory storage medium having stored thereon instructions that, when executed by a processor, cause the processor to perform an image processing method for comparing and correcting images, the method comprising:
  (a) selecting images comprising a monochromic image A2 and a monochromic image B2;
  (b) extracting skeletons of the objects of the monochromic image B2 to generate a skeleton image B3;
  (c) covering the skeleton image B3 with the monochromic image A2 to generate a covered image B4;
  (d) correcting allowable variances in the covered image B4;
  (e) extracting skeletons of the objects in the monochromic image A2 to generate a skeleton image A3;
  (f) covering the skeleton image A3 with the monochromic image B2 to generate a covered image A4;
  (g) correcting allowable variances in the covered image A4; and
  (h) outputting the covered images A4 and B4 with corrected variances.

12. The non-transitory storage medium as described in claim 11, wherein if the selected images comprising a color image A and a color image B, the method further comprises, before step (a):
  converting the color image A to a grayscale image A1 and the color image B to a grayscale image B1 by computing a gray value of each pixel of the color images A and B using a conversion formula; and
  converting the grayscale image A1 to the monochromic image A2 and the grayscale image B1 to the monochromic image B2 by comparing a gray value of each point of the grayscale images A1 and B1 with a predefined threshold value.

13. The non-transitory storage medium as described in claim 11, wherein step (b) comprises:
  reading pixel values of all points in each row of the monochromic image B2;
  searching the pixel values of the objects of the monochromic image B2 in each row to locate groups that include consecutive pixel values of the objects; and
  updating the pixel values in each group by maintaining a central pixel value and changing the other pixel values.

14. The non-transitory storage medium as described in claim 11, wherein step (c) comprises:

(A) acquiring pixel values of all points in the first row of the monochromic image A2 and pixel values of all points in the first row of the skeleton image B3;

(B) covering the first point in the first row of the skeleton image B3 with the first point in the first row of the monochromic image A2 upon the condition that the pixel value of the first point in the first row of the monochromic image A2 is the same as the pixel value of the first point in the first row of the skeleton image B3, or the pixel value of the first point in the first row of the monochromic image A2 is 0; or (C) coloring the first point in the first row of the skeleton image B3 upon the condition that the pixel value of the first point in the first row of the monochromic image A2 is different from the pixel value of the first point in the first row of the skeleton image B3, and the pixel value of the first point in the first row of the monochromic image A2 is not 0;

(D) repeating steps (B) and (C) until all points in the first row of the skeleton image B3 are covered or colored; and (E) repeating steps (A) to (D) until all points in all rows of the skeleton image B3 are covered or colored.

15. The non-transitory storage medium as described in claim 11, wherein step (d) comprises:
  (1) acquiring pixel values of all points in the first row of the monochromic image A2 and pixel value of all points in the first row of the covered image B4;
  (2) deleting the first point from the first row of the covered image B4 upon the condition that the pixel value of the first point in the first row of the monochromic image A2 is the same as the pixel value of the first point in the first row of the covered image B4;
  (3) acquiring a plurality of points from the monochromic image A2 to determine whether the first point in the first row of the covered image B4 is to be deleted or retained upon the condition that the pixel value of the first point in the first row of the monochromic image A2 is different from the pixel value of the first point in the first row of the covered image B4, wherein the plurality of acquired points is adjacent to the first point in the first row of the monochromic image A2;
  (4) deleting the first point from the first row of the covered image B4 upon the condition that at least one of the plurality of acquired points has the same pixel value as the objects of the monochromic image A2; or
  (5) retaining the first point in the first row of the covered image B4 upon the condition that none of the plurality of acquired points has the same pixel value as the objects of the monochromic image A2;
  (6) repeating step (2) to (5) until it has been determined whether all points in the first row of the covered image B4 being determined are to be deleted or retained; and
  (7) repeating step (1) to (6) until it has been determined whether all points in all rows of the covered image B4 are to be deleted or retained.

16. An image processing system for comparing and correcting images, the system comprising:
  an image selection module operable to select a monochromic image A2 and a monochromic image B2 from a storage system;
  an image skeleton extraction module operable to extract skeletons of objects in the monochromic image B2 to generate a skeleton image B3, and extract skeletons of objects in the monochromic image A2 to generate a skeleton image A3;
  an image covering module operable to cover the skeleton image B3 with the monochromic image A2 to generate a covered image B4, and cover the skeleton image A3 with the monochromic image B2 to generate a covered image A4;

a variance correction module operable to correct allowable variances in the covered images B4 and A4;

an image output module operable to output the covered images A4 and B4 with corrected variances; and a processor that executes the image selection module, the image skeleton extraction module, the image covering module, the variance correction module, and the image output module.

17. The system as described in claim 16, further comprising an image conversion module operable to convert color images A and B respectively into the monochromic images A2 and B2.

18. The system as described in claim 16, wherein the image covering module comprises:

a first image acquisition sub-module operable to acquire the monochromic image A2 and the skeleton image B3, and further operable to acquire the monochromic image B2 and the skeleton image A3, from the storage system;

a first pixel value acquisition sub-module operable to acquire pixel values of all points in an Nth row of the monochromic image A2 and acquire pixel values of all points in an Nth row of the skeleton image B3, and further operable to acquire pixel values of all points in an Nth row of the monochromic image B2 and acquire pixel values of all points in an Nth row of the skeleton image A3, wherein N=i++, and int i=1;

a first determination sub-module operable to determine whether the pixel value of an nth point in the Nth row of the monochromic image A2 is the same as the pixel value of an nth point in the Nth row of the skeleton image B3, determine whether the pixel value of the nth point in the Nth row of the monochromic image A2 is 0, determine if the nth point is the last point in the Nth row of the monochromic image A2, and further determine if the Nth row is the last row of the monochromic image A2, further operable to determine whether the pixel value of an nth point in the Nth row of the monochromic image B2 is the same as the pixel value of an nth point in the Nth row of the skeleton image A3, determine whether the pixel value of the nth point in the Nth row of the monochromic image B2 is 0, determine if the nth point is the last point in the Nth row of the monochromic image B2, and further determine if the Nth row is the last row of the monochromic image B2, wherein n=i++, and int i=1;

a covering sub-module operable to cover the nth point in the Nth row of the skeleton image B3 with the nth point in the Nth row of the monochromic image A2 upon the condition that the pixel value of the nth point in the Nth row of the monochromic image A2 is the same as the pixel value of the nth point in the Nth row of the skeleton image B3, or the pixel value of the nth point in the Nth row of the monochromic image A2 is 0, further operable to cover the nth point in the Nth row of the skeleton image A3 with the nth point in the Nth row of the monochromic image B2 upon the condition that the pixel value of the nth point in the Nth row of the monochromic image B2 is the same as the pixel value of the nth point in the Nth row of the skeleton image A3, or the pixel value of the nth point in the Nth row of the monochromic image B2 is 0and a coloring sub-module operable to color the nth point in the Nth row of the skeleton image B3 upon the condition that the pixel value of the nth point in the Nth row of the monochromic image A2 is different from the pixel value of the nth point in the Nth row of the skeleton image B3 and the pixel value of the nth point in the Nth row of the monochromic image A2 is not 0, and further operable to color the nth point in the Nth row of the skeleton image A3 upon the condition that the pixel value of the nth point in the Nth row of the monochromic image B2 is different from the pixel value of the nth point in the Nth row of the skeleton image A3 and the pixel value of the nth point in the Nth row of the monochromic image B2 is not 0.

19. The system as described in claim 16, wherein the variance correction module comprises:

a second image acquisition sub-module operable to acquire the monochromic image B2 and the covered image A4, and further acquire the monochromic image A2 and the covered image B4 from the storage system;

a second pixel value acquisition sub-module operable to acquire pixel values of all points in an Nth row of the monochromic image B2 and pixel value of all points in an Nth row of the covered image A4, and further operable to acquire pixel values of all points in an Nth row of the monochromic image A2 and pixel value of all points in an Nth row of the covered image B4, wherein N=i++, and int i=1;

a second determination sub-module operable to determine whether the pixel value of an nth point in the Nth row of the monochromic image B2 is the same as the pixel value of an nth point in the Nth row of the covered image A4, determine if the nth point is the last point in the Nth row of the monochromic image B2, and further determine if the Nth row is the last row of the monochromic image A4, and further operable to determine whether the pixel value of an nth point in the Nth row of the monochromic image A2 is the same as the pixel value of an nth point in the Nth row of the covered image B4, determine if the nth point is the last point in the Nth row of the monochromic image A2, and further determine if the Nth row is the last row of the monochromic image B4, wherein n=i++, and int i=1;

a point acquisition sub-module operable to acquire a plurality of points adjacent to the nth point in the Nth row of the monochromic image B2 upon the condition that the pixel value of the nth point in the Nth row of the monochromic image B2 is different from the pixel value of the nth point in the Nth row of the covered image A4, and further operable to acquire a plurality of points which are adjacent to the nth point in the Nth row of the monochromic image A2 upon the condition that the pixel value of the nth point in the Nth row of the monochromic image A2 is different from the pixel value of the nth point in the Nth row of the covered image B4; and a deletion sub-module operable to delete the nth point from the Nth row of the covered image A4 upon the condition that at least one of the plurality of acquired points has the same pixel value as the objects in the monochromic image B2, and further operable to delete the nth point from the Nth row of the covered image B4 upon the condition that at least one of the plurality of acquired points has the same pixel value as the objects in the monochromic image A2.

* * * * *